(12) United States Patent
Chen et al.

(10) Patent No.: US 9,716,789 B2
(45) Date of Patent: Jul. 25, 2017

(54) METHOD, DEVICE, TERMINAL AND SERVER FOR REPLYING CALL

(71) Applicant: Xiaomi Inc., Beijing (CN)

(72) Inventors: Chao Chen, Beijing (CN); Dayu Sun, Beijing (CN); Shen Li, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/871,570

(22) Filed: Sep. 30, 2015

(65) Prior Publication Data

US 2016/0191707 A1   Jun. 30, 2016

Related U.S. Application Data

(63) Continuation of application No. PCT/CN2015/077857, filed on Apr. 29, 2015.

(30) Foreign Application Priority Data

Dec. 27, 2014   (CN) .......................... 2014 1 0832183

(51) Int. Cl.
*H04M 3/436* (2006.01)
*H04M 19/04* (2006.01)
(Continued)

(52) U.S. Cl.
CPC ....... *H04M 3/436* (2013.01); *H04M 3/42059* (2013.01); *H04M 19/04* (2013.01);
(Continued)

(58) Field of Classification Search
CPC .. H04M 3/436; H04M 3/42059; H04M 19/04; H04W 4/16; H04W 8/183
(Continued)

(56) References Cited

U.S. PATENT DOCUMENTS

2003/0233418 A1* 12/2003 Goldman ............. G06Q 10/107
                                                                 709/206
2007/0275698 A1   11/2007 Kuiken et al.
(Continued)

FOREIGN PATENT DOCUMENTS

CN   1735105 A   2/2006
CN   1984195 A   6/2007
(Continued)

OTHER PUBLICATIONS

International Search Report issued in corresponding application PCT/CN2015/077857, dated Sep. 18, 2015, pp. 1-4.
(Continued)

*Primary Examiner* — Magdi Elhag

(57) ABSTRACT

The present disclosure relates to a method, device, terminal and server for replying a call. The method includes during the course of receiving an incoming call, sending a caller number to a yellow pages server when a number consistent with the caller number is not stored in a local address book, which determines a caller name corresponding to the caller number, receiving the caller name returned by the yellow pages server, determining whether a call reply operation is performed by a user, when the call replying operation is performed by the user, determining a designated grouping type corresponding to the caller number according to the caller name, determining a designated reply content matched with the designated grouping type according to a corresponding relationship between the grouping type and the reply content, and sending the designated reply content to the caller number.

18 Claims, 10 Drawing Sheets

(51) Int. Cl.
*H04M 3/42* (2006.01)
*H04W 4/16* (2009.01)
*H04W 8/18* (2009.01)
*H04W 88/02* (2009.01)

(52) U.S. Cl.
CPC .......... *H04W 4/16* (2013.01); *H04W 8/183* (2013.01); *H04W 88/02* (2013.01)

(58) Field of Classification Search
USPC ...... 455/410, 412.1, 412.2, 413, 414.1, 415, 455/567
See application file for complete search history.

(56) References Cited

U.S. PATENT DOCUMENTS

| | | | | |
|---|---|---|---|---|
| 2008/0108334 | A1* | 5/2008 | Wang | H04M 3/42017 455/414.1 |
| 2012/0196582 | A1* | 8/2012 | Ahn | H04M 3/42042 455/415 |
| 2014/0128047 | A1* | 5/2014 | Edwards | H04L 51/12 455/415 |
| 2014/0179281 | A1 | 6/2014 | Kim et al. | |
| 2014/0206321 | A1* | 7/2014 | Mohapatra | H04W 4/12 455/413 |
| 2015/0249737 | A1* | 9/2015 | Spievak | H04M 3/436 379/189 |
| 2015/0271650 | A1* | 9/2015 | Osanai | H04M 3/56 455/518 |
| 2017/0026328 | A1* | 1/2017 | Adkins | H04L 51/12 |

FOREIGN PATENT DOCUMENTS

| | | |
|---|---|---|
| CN | 101355602 A | 1/2009 |
| CN | 201623748 U | 11/2010 |
| CN | 102055832 A | 5/2011 |
| CN | 103078949 A | 5/2013 |
| EA | 006009 B1 | 8/2005 |
| EP | 2787714 | 10/2014 |
| JP | 2002094697 A | 3/2002 |
| JP | 3175699 U | 5/2012 |
| KR | 20030000637 A | 1/2003 |
| KR | 1020060040095 | 5/2006 |
| KR | 1020120042110 | 5/2012 |
| RU | 2407207 C1 | 12/2010 |

OTHER PUBLICATIONS

Office Action for Chinese Application No. 201410832183 dated Dec. 23, 2016.
Office Action for Korean Application No. 043450414 dated Sep. 5, 2016.
International Search Report for PCT/CN2015/077857 dated Sep. 18, 2015.
Extended European Search Report for Application No. 15201426.2 dated Jul. 13, 2016.
Office Action issued in corresponding Japanese Application No. 2016-565540 with English translation, dated Jan. 17, 2017, 6 pages.
Office Action issued in corresponding Russian Application No. 2015134360 with English translation, dated Oct. 14, 2016, 17 pages.

* cited by examiner 010-62671188

Remind me  Message

Reject  Answer

METHOD, DEVICE, TERMINAL AND SERVER FOR REPLYING CALL

CROSS-REFERENCE TO RELATED APPLICATIONS

This application is a continuation of International Application No. PCT/CN2015/077857, filed Apr. 29, 2015, which is based upon and claims priority to Chinese Patent Application No. 201410832183.3, filed Dec. 27, 2014, the entire contents of which are incorporated herein by reference.

TECHNICAL FIELD

The present disclosure relates to the field of communication technologies and, more particularly, to a method, a device, a terminal and a server for replying a call.

BACKGROUND

The statements in this section merely provide background information related to the present disclosure and may not constitute prior art.

In daily life and work, we usually receive calls from others in situations such as during a conference, or a rest. If a no-disturbing mode has been set yet, then the user can select to ignore the call; and if the no-disturbing mode was not set before, the user will usually select to hang up the call manually due to reasons such as affecting the conference progress or the rest of the user. This is a bad experience both to the user and to the caller. At this moment, if a method for replying a call is provided, the user can be prevented from missing important affairs, and the experience of the caller can be improved.

Referring to FIG. 1, an "information" option will be displayed in a call interface for the user after receiving a call in the related art. If it is not convenient for the user to answer the call currently, then the user may click the option to reject the call, edit a short message manually and send the short message to the calling number, so as to remind the caller that it is not convenient to answer the call currently.

SUMMARY

The present disclosure provides a method, a device, a terminal, and a server for replying a call.

According to a first aspect of embodiments of the present disclosure, there is provided a method for replying a call. The method includes during the course of receiving an incoming call, sending a caller number to a yellow pages server when a number consistent with the caller number is not stored in a local address book, which determines a caller name corresponding to the caller number, receiving the caller name returned by the yellow pages server, detecting whether a call reply operation is performed by a user, when the call replying operation is performed by the user, determining a designated grouping type corresponding to the caller number according to the caller name, and determining a designated reply content matched with the designated grouping type according to a corresponding relationship between the grouping type and the reply content. The grouping type at least includes a service class number and a contact number. The method also includes sending the designated reply content to the caller number.

According to a second aspect of embodiments of the present disclosure, there is provided a method for replying a call. The method includes receiving a caller number sent by a terminal, determining a caller name corresponding to the caller number according to a corresponding relationship between number information and a number name, sending the caller name to the terminal which, when a call reply operation is performed by a user, determines a designated grouping type corresponding to the caller number according to the caller name, determine a designated reply content matched with the designated grouping type according to a corresponding relationship between the grouping type and the reply content, and send the designated reply content to the caller number. The grouping type at least includes a service class number and a contact number.

According to a third aspect of embodiments of the present disclosure, there is provided a terminal. The terminal includes a processor, and a memory for storing instructions executable by the processor. The processor is configured to during the course of receiving an incoming call, send a caller number to a yellow pages server when a number consistent with the caller number is not stored in a local address book. The yellow pages server being configured to determine a caller name corresponding to the caller number. The processor is configured to receive the caller name returned by the yellow pages server, determine whether a call reply operation is performed by a user, when the call replying operation is performed by the user, determine a designated grouping type corresponding to the caller number according to the caller name, and determine a designated reply content matched with the designated grouping type according to a corresponding relationship between the grouping type and the reply content. The grouping type at least includes a service class number and a contact number. The processor is configured to send the designated reply content to the caller number.

According to a fourth aspect of embodiments of the present disclosure, there is provided a server. The server includes a processor, and a memory for storing instructions executable by the processor. The processor is configured to receive a caller number sent by a terminal, determine a caller name corresponding to the caller number according to a corresponding relationship between number information and a number name, send the caller name to the terminal which determines a designated grouping type corresponding to the caller number according to the caller name when a call reply operation is performed by a user, determine a designated reply content matched with the designated grouping type according to a corresponding relationship between the grouping type and the reply content and send the designated reply content to the caller number. The grouping type at least including a service class number and a contact number.

The technical solutions provided by the embodiments of the present disclosure may, in part, include the following advantageous effects. During the course of receiving an incoming call, the terminal sends the caller number to the yellow pages server when the number consistent with the caller number is not stored in the local address book, and the yellow pages server determines the caller name corresponding to the caller number. Afterwards, if it is determined that the call reply operation is performed by the user, the terminal determines the designated grouping type corresponding to the caller number according to the obtained caller name, so as to determine the designated reply content matched with the designated grouping type according to the corresponding relationship between the grouping type and the reply content, and automatically send the designated reply content to the caller number. Since the terminal can identify unknown calls through the yellow pages server, and automatically return different reply contents to the caller number according to different identification results, such manner of replying a call is simple and convenient to operate, is more intelligent, and has an optimal simplification.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

The yellow pages server is introduced briefly before the embodiments of the present disclosure are described in details.

The yellow pages refers to an internationally general telephone directory for industrial and commercial enterprises prepared according to enterprise properties and product categories. The main contents of the yellow pages are publication of enterprise names, addresses and telephone numbers. The yellow pages is equivalent to a household register of industrial and commercial enterprises in a city or a region, and is printed and produced using yellow pages according to the international conventions, thereby is called as "Yellow Pages". With the rapid development of network techniques, in order to be convenient for the majority of users to query numbers at anytime and anywhere, the original papery yellow pages data is stored in the yellow pages server in an electronic form. The smart terminals of the user such as a smartphone and a tablet, after being installed with a yellow pages application, may be connected to the yellow pages server through the yellow pages application, to quickly and conveniently acquire number query information. The yellow pages server may store therein contact information of merchants or enterprises from all walks of life.

For instance, for an express company belonging to the service industry, such contact information as the name and contact number of each courier subordinated to the company may be stored in the yellow pages server. When a certain courier subordinated to the company calls a user, the user may immediately know who initiates the current unknown call through the yellow pages server. Moreover, it is also convenient for the user to determine the grouping type of the caller number based on the caller name returned by the yellow pages server after detecting the call reply operation of the user, thus automatically sending corresponding reply contents to the caller number.

Figure 1:
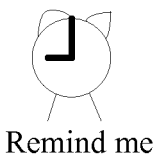
FIG. 1 is a schematic diagram of replying a call, according to the background of the present disclosure.
Figure 1:
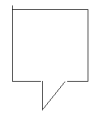
Figure 1:
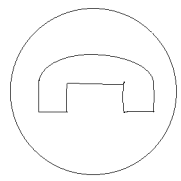
Figure 1:
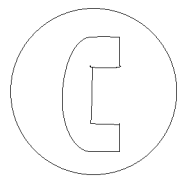
Figure 2:
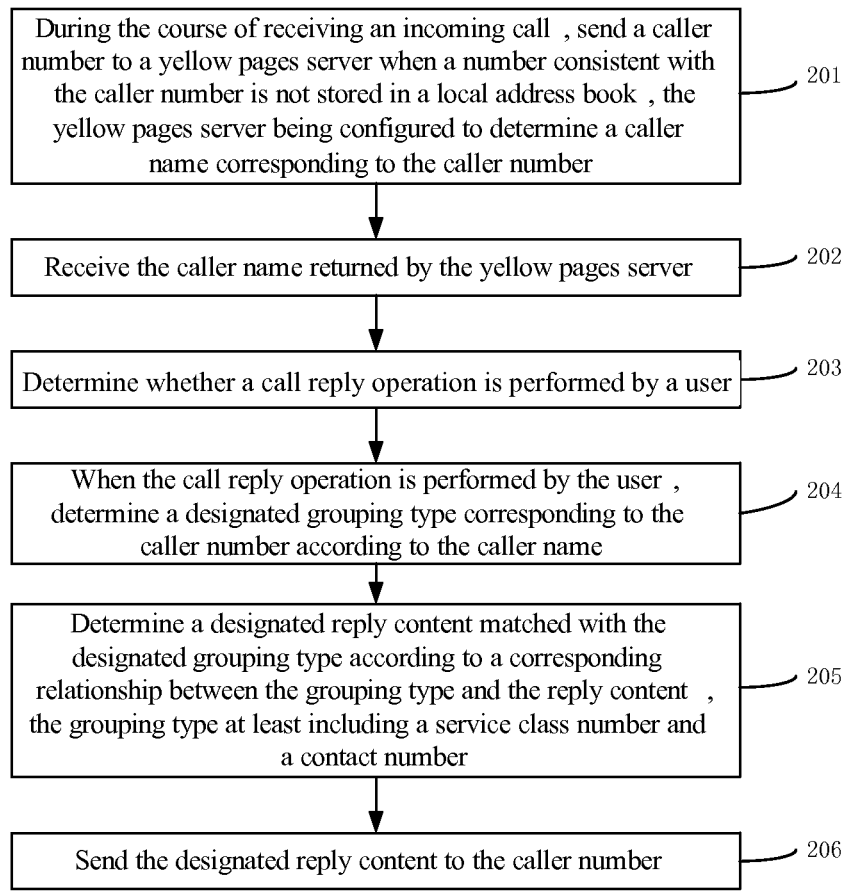
FIG. 2 is a flow chart of a method for replying a call, according to an exemplary embodiment.

FIG. 2 is a flow chart of a method for replying a call, according to an exemplary embodiment. As shown in FIG. 2, the method for replying a call is applied in a terminal, including the following steps.

In step 201, during the course of receiving an incoming call, a caller number is sent to a yellow pages server when a number consistent with the caller number is not stored in a local address book. The yellow pages server determines a caller name corresponding to the caller number.

In step 202, the caller name returned by the yellow pages server is received.

In step 203, it is determined whether a call replay operation is performed by a user. If the call reply operation is performed by the user, then the following step 204 is performed, and if the call reply operation is not performed by the user, then the process flow is ended.

In step 204, when the call replying operation is performed by the user, a designated grouping type corresponding to the caller number is determined according to the caller name.

In step 205, a designated reply content matched with the designated grouping type is determined according to a corresponding relationship between the grouping type and the reply content. The grouping type at least includes a service class number and a contact number.

In step 206, the designated reply content is sent to the caller number.

According to the method provided by embodiments of the present disclosure, during the course of receiving an incoming call, the terminal sends the caller number to the yellow pages server when the number consistent with the caller number is not stored in the local address book, and the yellow pages server determines the caller name corresponding to the caller number. Afterwards, if it is determined that the call reply operation is performed by the user, the terminal determines the designated grouping type corresponding to the caller number based on the obtained caller name, so as to determine the designated reply content matched with the designated grouping type according to the corresponding relationship between the grouping type and the reply content, and automatically send the designated reply content to the caller number. Since the terminal can identify unknown calls through the yellow pages server, and automatically return different reply contents to the caller number according to different identification results, the manner for replying a call is simple and convenient to operate, is more intelligent, and has an optimal simplification.

Optionally, before the sending the caller number to the yellow pages server, the method further includes if the number consistent with the caller number is stored in the local address book, determining the caller name corresponding to the caller number according to a designated contact information table entry in the local address book. The designated contact information table entry is an information table entry to which the caller number belongs.

Optionally, before the determining the designated grouping type corresponding to the caller number according to the caller name, the method further includes setting a plurality of grouping keywords corresponding to each grouping type. Determining the designated grouping type corresponding to the caller number according to the caller name includes performing a word segmentation on the caller name to obtain at least one word segment, determining whether the at least one word segment includes a certain grouping keyword corresponding to any grouping type, and if the at least one word segment includes the certain grouping keyword corresponding to any grouping type, determining the any grouping type as the designated grouping type corresponding to the caller number.

Optionally, after the determining the designated grouping type corresponding to the caller number according to the caller name, the method further includes when the caller number is determined to be a nuisance number according to the caller name, hanging up the current call.

Any combination of all the above optional technical solutions may be employed to form optional embodiments of the present invention, which will not be elaborated one by one herein.

Figure 3:
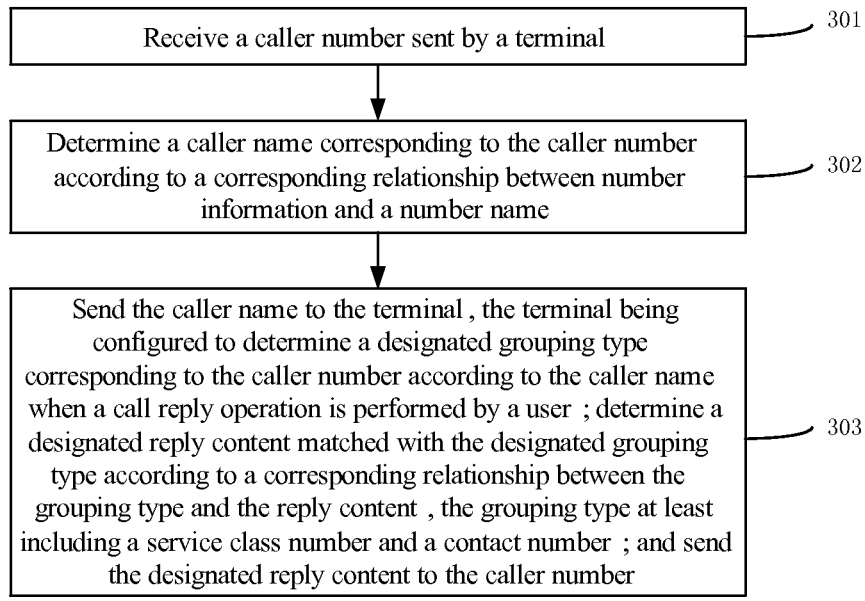
FIG. 3 is a flow chart of a method for replying a call, according to an exemplary embodiment.

FIG. 3 is a flow chart of a method for replying a call, according to an exemplary embodiment. As shown in FIG. 3, the method for replying a call is applied in a server, including the following steps.

In step 301, a caller number sent by a terminal is received.

In step 302, a caller name corresponding to the caller number is determined according to a corresponding relationship between number information and a number name.

In step 303, the caller name is sent to the terminal. The terminal determines a designated grouping type corresponding to the caller number according to the caller name when a call reply operation is performed by a user, and determine a designated reply content matched with the designated grouping type according to a corresponding relationship between the grouping type and the reply content. The grouping type at least includes a service class number and a contact number. The terminal sends the designated reply content to the caller number.

According to the method provided by embodiments of the present disclosure, during the course of receiving an incoming call, the terminal sends the caller number to the yellow pages server when the number consistent with the caller number is not stored in the local address book, and the yellow pages server determines the caller name corresponding to the caller number. Afterwards, if it is determined that the call reply operation is performed by the user, the terminal determines the designated grouping type corresponding to the caller number according to the obtained caller name, so as to determine the designated reply content matched with the designated grouping type according to the corresponding relationship between the grouping type and the reply content, and automatically sends the designated reply content to the caller number. Since the terminal can identify unknown calls through the yellow pages server, and automatically return different reply contents to the caller number according to different identification results, the manner for replying a call is simple and convenient to operate, is more intelligent, and has an optimal simplification.

Optionally, before receiving the caller number sent by the terminal, the method further includes receiving contact information sent by a plurality of terminals, which at least includes number information and a number name, and generating a corresponding relationship between the number information and the number name according to the received contact information, and storing the corresponding relationship.

Alternatively, before receiving the caller number sent by the terminal, the method further includes acquiring the contact information from the plurality of terminals, generating the corresponding relationship between the number information and the number name according to the acquired contact information, and storing the corresponding relationship.

Any combination of all the above optional technical solutions may be employed to form optional embodiments of the present invention, which will not be elaborated one by one herein.

Figure 4:
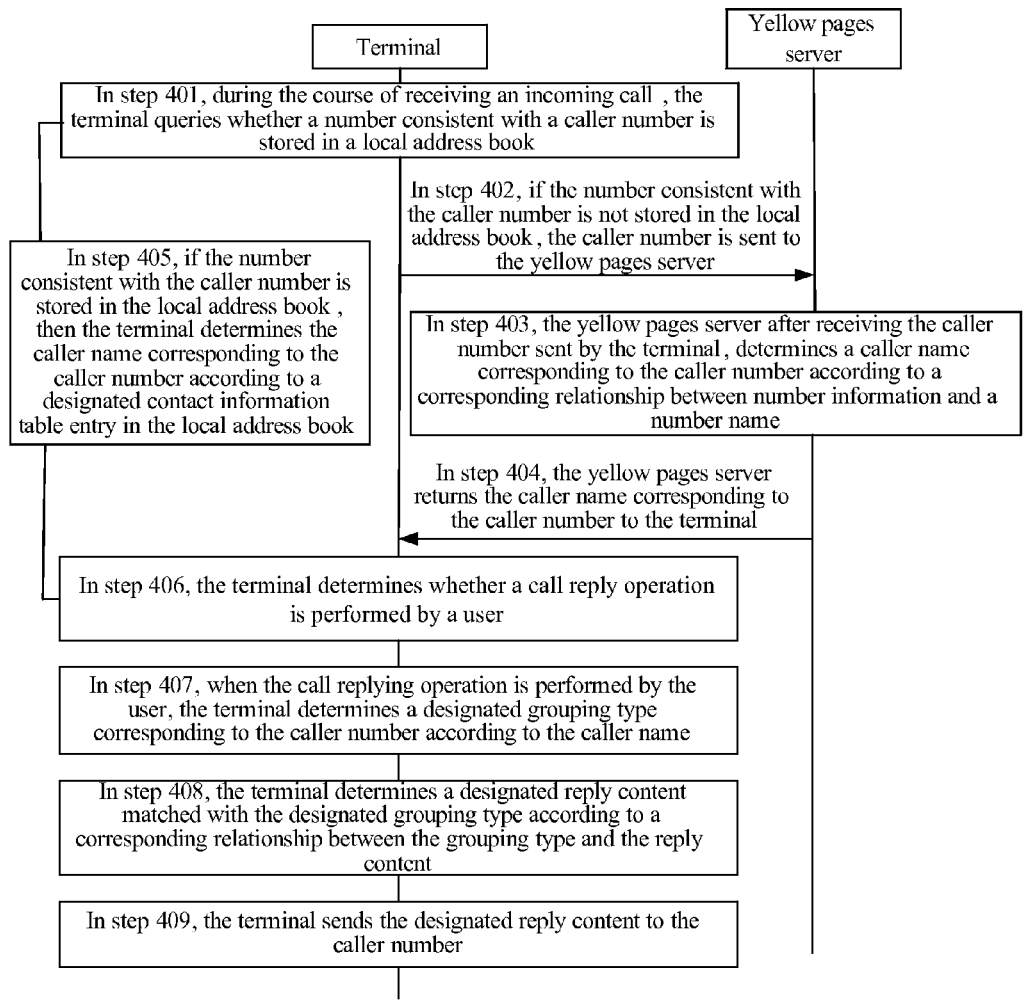
FIG. 4 is a flow chart of a method for replying a call, according to an exemplary embodiment.

FIG. 4 is a flow chart of a method for replying a call, according to an exemplary embodiment, which uses a terminal and a yellow pages server as interactive bodies. As shown in FIG. 4, the method for replying a call includes the following steps.

In step 401, during the course of receiving an incoming call, the terminal queries whether a number consistent with a caller number is stored in a local address book. If the number consistent with the caller number is not stored in the local address book, then the following step 402 is performed, and if the number consistent with the caller number is stored in the local address book, then the following step 405 is performed.

In embodiments of the present disclosure, during the course of receiving an incoming call, the terminal will query a caller name corresponding to the caller number for a user to identify who initiates the call, so as to display the caller name together with the caller number on a terminal interface. When querying the caller name corresponding to the caller number, the terminal will preferentially search in its local address book. The following manner may be employed for the terminal to query whether the number consistent with the caller number is stored in the local address book.

The manner includes reading local address book, comparing the caller number with all the numbers recorded in the local address book one by one. When none of the numbers recorded in the local address book is matched with the caller number, the terminal determines that no number consistent with the caller number is stored in the local address book, and when the digit bits of a certain number recorded in the local address book are identical to that of the caller number one by one, determines that the number consistent with the caller number is stored in the local address book.

Certainly, except the above query manner, other query manners can also be employed, which will not be specifically defined in embodiments of the present disclosure.

In step 402, if the number consistent with the caller number is not stored in the local address book, then the caller number is sent to a yellow pages server.

In embodiments of the present disclosure, since the number consistent with the caller number is not stored in the local address book, it also needs to send the caller number to the yellow pages server through a yellow pages application for the user to obtain relevant information of the caller.

Furthermore, the terminal can automatically send the caller number to the yellow pages server after determining the login status of the yellow pages application of the user. Therefore, it also needs to prompt the user to log in the yellow pages application through a designated account number in advance.

When the terminal sends the caller number to the yellow pages server, in order to ensure the data transmission security, the caller number can be encrypted and then sent to the yellow pages server by using a wireless sending mode. When encrypting the caller number, such encryption ways as AES (Advanced Encryption Standard), and DES (Data Encryption Standard) may be employed, which will not be specifically defined in embodiments of the present disclosure.

In step 403, after receiving the caller number sent by the terminal, the yellow pages server determines a caller name corresponding to the caller number according to a corresponding relationship between number information and a number name.

In embodiments of the present disclosure, after receiving the data sent by the terminal, if the data is encrypted, the yellow pages server needs to firstly take a decryption algorithm reverse to the encryption algorithm in the foregoing step 402 to decrypt the data, so as to obtain the caller number.

A large amount of contact information relating to all walks of life is stored in the yellow pages server. Usually the stored large amount of information may be obtained through the following two manners.

According to a first manner, contact information sent by a plurality of terminals is received. The contact information at least includes number information and a number name. A corresponding relationship between the number information and the number name is generated according to the received contact information, and the corresponding relationship is stored.

With respect to the first manner, various enterprises and merchants are usually willing to upload the contact information thereof to the yellow pages server automatically in order to enlarge the product influence thereof or improve the product popularity. Therefore, the yellow pages server handles the received contact information, generates a corresponding table entry, and inserts the corresponding table entry into the current corresponding relationship table.

According to a second manner, the contact information is acquired from the plurality of terminals. The corresponding relationship between the number information and the number name is generated according to the acquired contact information, and the corresponding relationship is stored.

With respect to the second manner, for instance, after the user receives a nuisance call, the yellow pages application may remind the user of marking the nuisance number. After the user marks the number, the yellow pages server acquires the nuisance number marked by the user from the terminal through the yellow pages application. An administrator may also initiatively acquire the contact information of various enterprises and merchants through various channels.

It should be illustrated that the contact information, except for including the number information and the number name, may also include address information, picture information and the like. The contents included in the contact information will not be specifically defined in embodiments of the present disclosure. When storing the foregoing contact information, the yellow pages server may adopt the table entry forms as shown in the following Table 1 for storing the contact information, which facilitates querying.

TABLE 1

| Number information | Number name | Address information | Picture |
|---|---|---|---|
| 138****1234 | ** Courier Mr. Wang | No. **, C1 Street, B1 District, A1 City | Logo1 |
| 010-****1234 | ** Hotel | No. **, C2 Street, B2 District, A2 City | Logo2 |
| 010****5678 | ** Bank | No. **, C3 Street, B3 District, A3 City | Logo3 |
| ... | ... | ... | |

When the yellow pages server determines the caller name corresponding to the caller number according to the corresponding relationship between the number information and the number name, the caller name corresponding to the caller number can be quickly acquired through such manners as performing traverse lookup or searching lookup in the table entry as shown in the foregoing Table 1.

In step 404, the yellow pages server returns the caller name corresponding to the caller number to the terminal.

In embodiments of the present disclosure, when the yellow pages server returns the caller name to the terminal, the caller name can be encrypted optionally and then sent based on the consideration of security. Certainly, the caller name can also be directly returned to the terminal, which will not be specifically defined in embodiments of the present disclosure.

In step 405, if the number consistent with the caller number is stored in the local address book, then the terminal determines the caller name corresponding to the caller number according to a designated contact information table entry in the local address book.

In embodiments of the present disclosure, the designated contact information table entry refers to an information table entry to which the caller number belongs. Since the number consistent with the caller number is stored in the local address book, then the caller name corresponding to the caller number can be determined through the local address book. The information table entry to which each number in the local address book belongs all includes the number name. Therefore, the caller name can be quickly determined according to the contact information table entry. The contact information table entry, in addition to necessary number information and number name, may also include other information such as pictures, contact addresses, and contact mailbox, which will not be specifically defined in embodiments of the present disclosure.

In step 406, the terminal determines whether a call reply operation is performed by a user. If the call reply operation is performed by the user, then the following step 407 is performed, and if the call reply operation is not performed by the user, then the process flow is ended.

Figure 5:
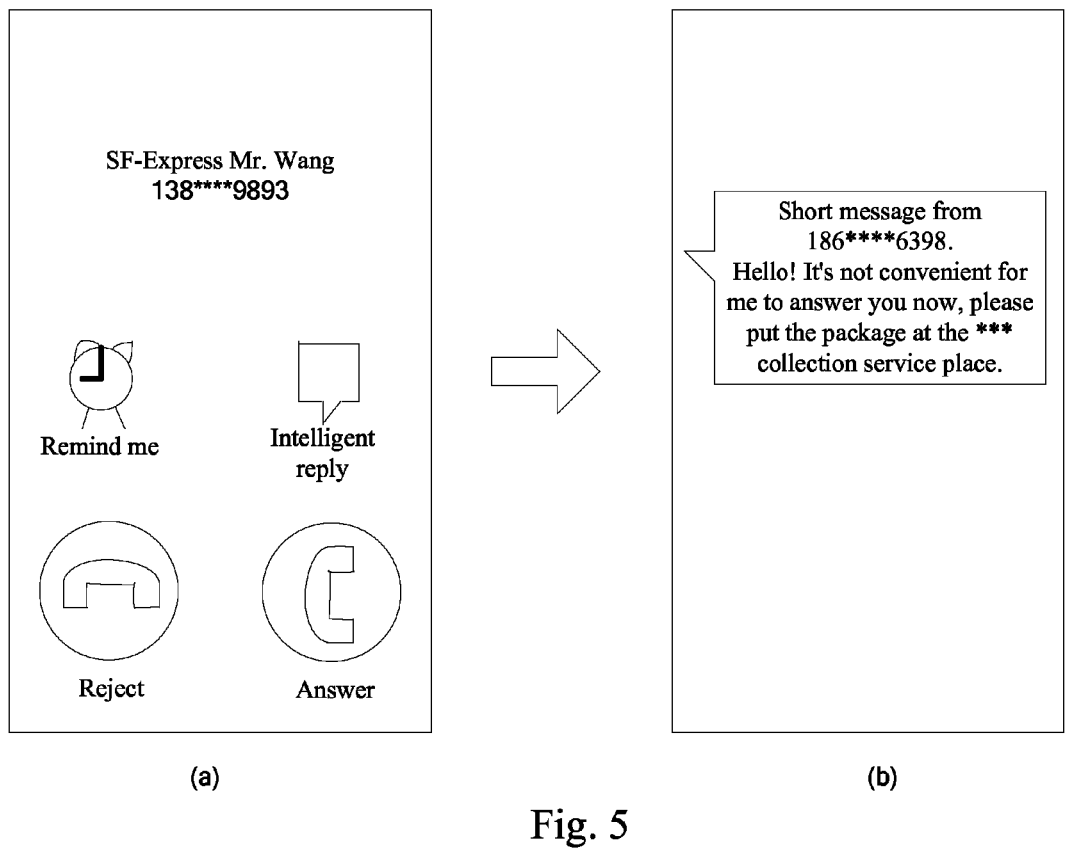
FIG. 5 is a schematic diagram of replying a call, according to an exemplary embodiment.

In embodiments of the present disclosure, when a call is coming, the terminal will display an incoming call page as shown in FIG. 5(a) on the terminal interface. The page at least needs to display the caller number, the caller name, a "Reject answering" virtual key, an "Answer" virtual key, an "Intelligent reply" virtual key and a "Reminding later" virtual key. When the "Intelligent reply" virtual key is clicked, the terminal may determine that the call reply operation is performed by the user, and perform the following step 407 to step 409.

In step 407, when the call replying operation is performed by the user, the terminal determines a designated grouping type corresponding to the caller number according to the caller name.

In embodiments of the present disclosure, the grouping type at least includes a service class number, a contact number and a nuisance class number. The service class number may refer to the number of various service class enterprises or individuals such as an express company number, a hotel number, a bank number, a taxi number, an operator number, and a housekeeping service number. The contact number refers to the number of contacts in the local address book, including the number of the contacts such as family members, friends, classmates, colleagues, and business partners. The nuisance class number refers to a number belonging to advertising promotion, telecommunication fraud, various illegal agencies, and the like.

Furthermore, before the terminal determines the designated grouping type corresponding to the caller number according to the caller name, the method provided by embodiments of the present disclosure further includes the step of setting a plurality of grouping keywords corresponding to each grouping type. For instance, with respect to the service class number, the corresponding grouping keywords thereof may include hotel, express, bank, taxi, convenience store, restaurant, various merchant names, and the like. With respect to the contact number, the corresponding grouping keywords thereof may include mother, father, aunt, uncle (father's brother), uncle (mother's brother), various family names, contact names in the local address book, and the like. With respect to the nuisance class number, the corresponding grouping keywords thereof may include promotion, advertisement, agency, fraud, and the like.

The following manner may be employed for the terminal to determine the designated grouping type corresponding to the caller number according to the caller name. The terminal performs a word segmentation on the caller name to obtain at least one word segment, determines whether the at least one word segment includes the grouping keyword corresponding to any grouping type, and if the at least one word segment includes the grouping keyword corresponding to a certain grouping type, then determines the certain grouping type as the designated grouping type corresponding to the caller number.

Referring to FIG. 5(a), taking the caller number of 138****9893, and the caller name of "SF-Express Mr. Wang" for example, the terminal while performing word segmentation, will divide "SF-Express Mr. Wang" into two words, i.e., "SF-Express" and "Mr. Wang". The word "SF-Express" belongs to the service class grouping type mentioned above, then the service class number is determined as the designated grouping type corresponding to the caller number.

If it is determined in the step that the caller number belongs to a nuisance number, then the following step 408 and step 409 will not be performed to automatically reply the caller number, and the call can be directly hung up.

In step 408, the terminal determines a designated reply content matched with the designated grouping type according to a corresponding relationship between the grouping type and the reply content.

In embodiments of the present disclosure, before determining the designated reply content matched with the designated grouping type according to the corresponding relationship between the grouping type and the reply content, the terminal also sets and stores reply contents corresponding to each grouping type. Each grouping type may correspond to one class of reply contents. That is, with respect to the sub-items included in each grouping type, the reply content can be further subdivided. For instance, with respect to the service class number, it includes an express company number, a hotel number, a bank number, a taxi number, an operator number, a housekeeping service class number, and the like. Each class of the foregoing number may correspond to different reply contents as shown in the following Table 2.

TABLE 2

| Operator number | Express number | Hello! It's not convenient for me to answer you now, please put the package at the collection service place. |
| | Hotel number | Hello! It's not convenient for me to answer you now, please leave me a message when you hear the beep. |
| | Operator number | Hello! It's not convenient for me to answer you now, please inform me by using a short message. |
| | Bank number | Hello! It's not convenient for me to answer you now, please call me on the weekend. |
| . . . | . . . | |

Certainly, each grouping type may also correspond to consistent reply content, which will not be specifically defined in embodiments of the present disclosure.

The following manner may be employed when the terminal determines the designated reply content matched with the grouping type according to the corresponding relationship between the grouping type and the reply content.

When the designated grouping type refers to a service class number, the terminal determines a first class designated reply content corresponding to the service class number by looking up in the corresponding relationship between the grouping type and the reply content as shown in the above Table 2 according to the designated grouping type, and when the designated grouping type refers to a contact number, the terminal determines a second class designated reply content corresponding to the service class number by looking up in the corresponding relationship between the grouping type and the reply content as shown in the above Table 2 according to the designated grouping type.

For instance, when the terminal determines that the current call is from a courier, after determining that the user clicks the "Intelligent reply" virtual key as shown in FIG. 5(a), the terminal rejects the call and automatically replies the designated reply content such as "Hello! It's not convenient for me to answer you now, please put the package at the collection service place" as shown in the above Table 2 according to the call type.

In step 409, the terminal sends the designated reply content to the caller number.

In embodiments of the present disclosure, after sending the reply content to the caller number, the terminal will display the reply content as shown in FIG. 5(b) on a terminal interface corresponding to the caller number, so as to prompt the caller that the current user is busy now, and the caller can handle with discretion according to the reply content. For instance, for the courier Mr. Wang, he can put the expressage of the user at the collection service place mentioned in the reply content of the user. In this way, the experience of the caller can be improved, and the user can be avoided missing important issues.

According to the method provided by embodiments of the present disclosure, during the course of receiving an incoming call, the terminal sends the caller number to the yellow pages server when the number consistent with the caller number is not stored in the local address book, and the yellow pages server determines the caller name corresponding to the caller number. Afterwards, if it is determined that the call reply operation is performed by the user, the terminal determines the designated grouping type corresponding to the caller number according to the obtained caller name, so as to determine the designated reply content matched with the designated grouping type according to the corresponding relationship between the grouping type and the reply content, and automatically send the designated reply content to the caller number. Since the terminal can identify unknown calls through the yellow pages server, and automatically return different reply contents to the caller number according to different identification results, the manner of replying a call is simple and convenient to operate, is more intelligent, and has an optimal simplification. When the user is not convenient to answer the call, the method provided by embodiments of the present disclosure can help the caller obtain a prompt as detailed as possible, and meanwhile provides the user with a better service, so that the user experience is improved.

Figure 6:
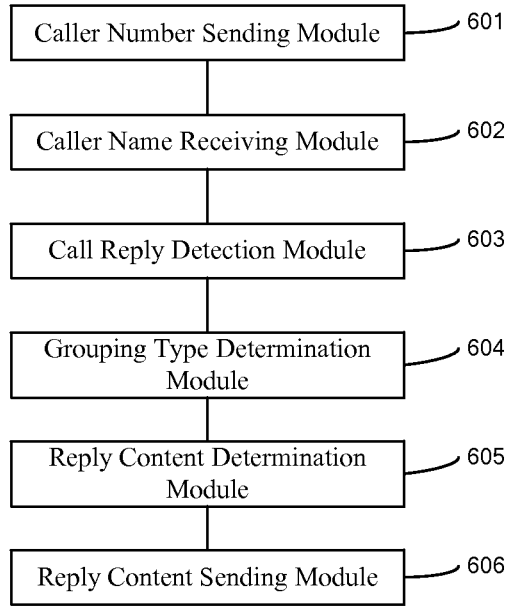
FIG. 6 is a block diagram of a first device for replying a call, according to an exemplary embodiment.

FIG. 6 is a block diagram of a device for replying a call, according to an exemplary embodiment. Referring to FIG. 6, the device includes a caller number sending module 601, a caller name receiving module 602, a call reply detection module 603, a grouping type determination module 604, a reply content determination module 605, and a reply content sending module 606.

The caller number sending module 601 is configured to, during the course of receiving an incoming call, send a caller number to a yellow pages server when a number consistent with the caller number is not stored in a local address book. The yellow pages server determines a caller name corresponding to the caller number. The caller name receiving module 602 is connected with the caller number sending module 601, and configured to receive the caller name returned by the yellow pages server. The call reply detection module 603 is connected with the caller name receiving module 602, and configured to determine whether a call reply operation is performed by a user. The grouping type determination module 604 is connected with the call reply detection module 603, and configured to determine a designated grouping type corresponding to the caller number according to the caller name when the call reply operation is performed by the user. The reply content determination module 605 is connected with the grouping type determination module 604, and configured to determine a designated reply content matched with the designated grouping type according to a corresponding relationship between the grouping type and the reply content, the grouping type at least including a service class number and a contact number; and the reply content sending module 606 is connected with the reply content determination module 605, and configured to send the designated reply content to the caller number.

Figure 7:
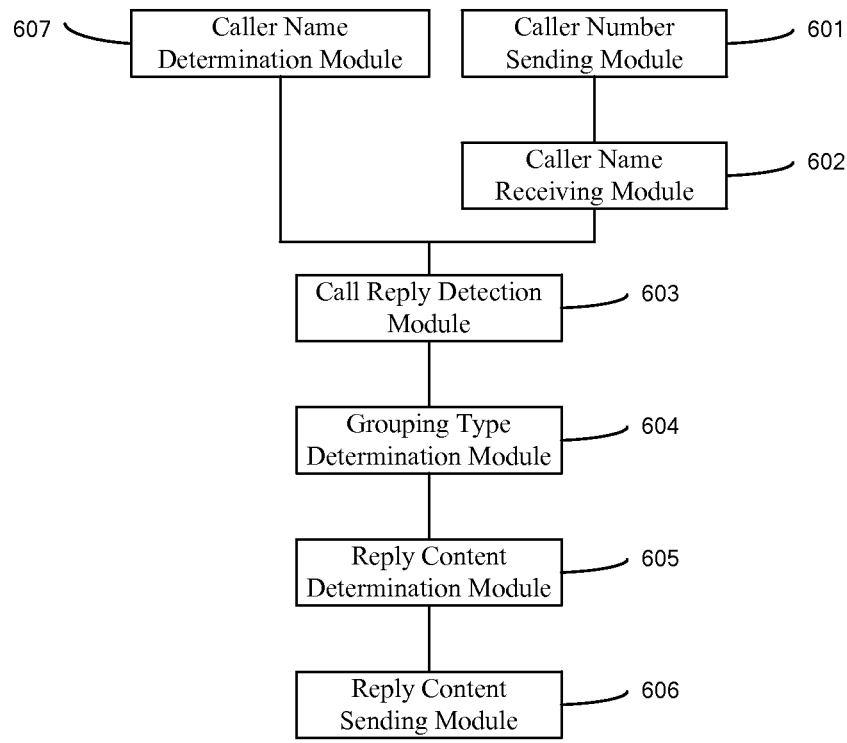
FIG. 7 is a block diagram of a second device for replying a call, according to an exemplary embodiment.

Optionally, referring to FIG. 7, the device further includes a caller name determination module 607 configured to, when the number consistent with the caller number is stored in the local address book, determine a caller name corresponding to the caller number according to a designated contact information table entry in the local address book. The designated contact information table entry is an information table entry to which the caller number belongs.

Figure 8:
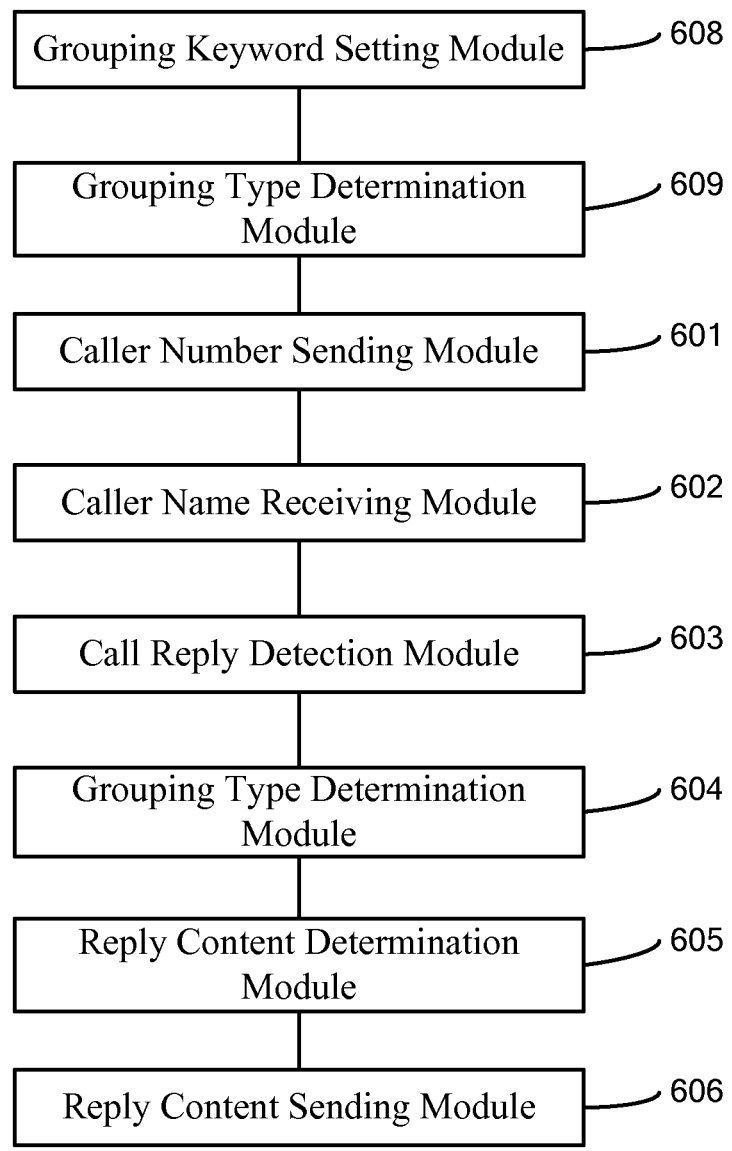
FIG. 8 is a block diagram of a third device for replying a call, according to an exemplary embodiment.

Optionally, referring to FIG. 8, the device further includes a grouping keyword setting module 608 configured to set a plurality of grouping keywords corresponding to each grouping type, and a grouping type determination module 609 configured to perform a word segmentation on the caller name to obtain at least one word segment, determine whether the at least one word segment includes a grouping keyword corresponding to a certain grouping type, and when the at least one word segment includes the grouping keyword corresponding to the certain grouping type, determine the certain grouping type as the designated grouping type corresponding to the caller number.

Figure 9:
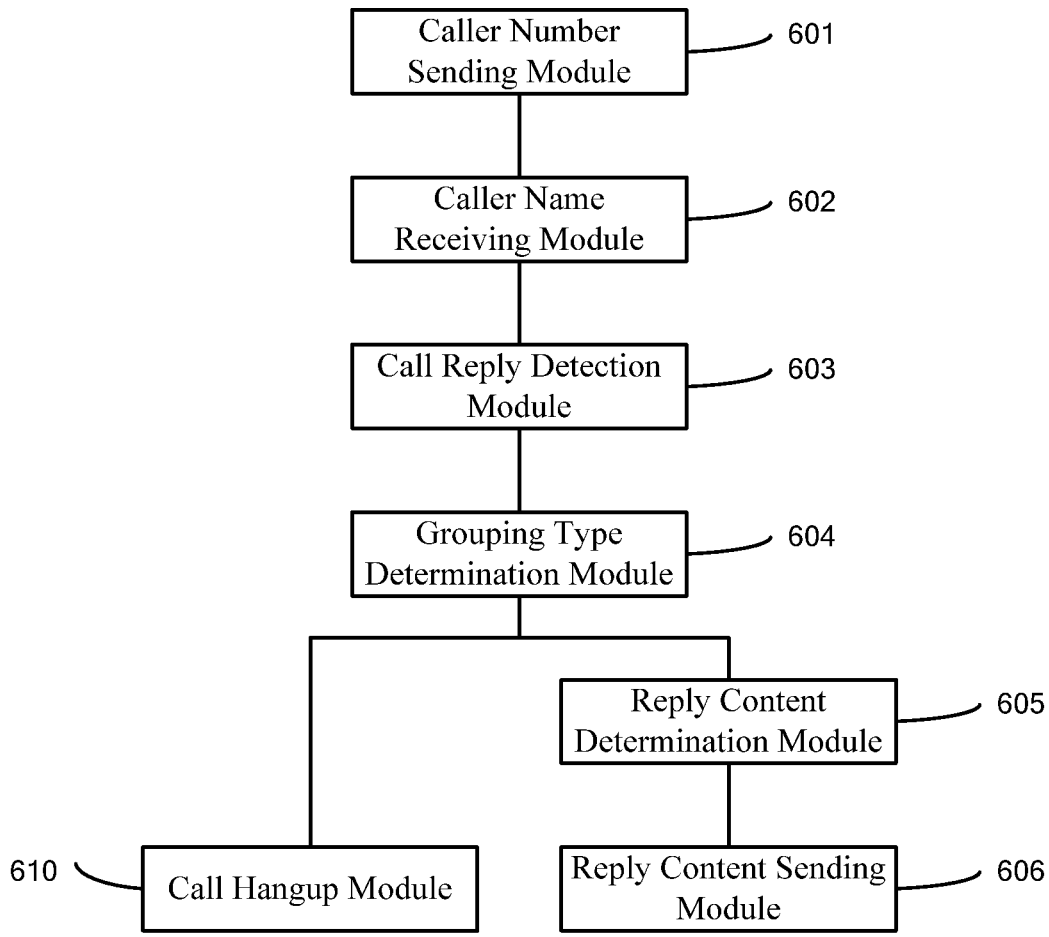
FIG. 9 is a block diagram of a fourth device for replying a call, according to an exemplary embodiment.

Optionally, referring to FIG. 9, the device further includes a call hangup module 610 configured to, when the caller number is determined to be a nuisance number according to the caller name, hang up the current call.

According to the device provided by embodiments of the present disclosure, during the course of receiving an incoming call, the terminal sends the caller number to the yellow pages server when the number consistent with the caller number is not stored in the local address book, and the yellow pages server determines the caller name corresponding to the caller number. Afterwards, if it is determined that the call reply operation is performed by the user, the terminal determines the designated grouping type corresponding to the caller number according to the obtained caller name, so as to determine the designated reply content matched with the designated grouping type according to the corresponding relationship between the grouping type and the reply content, and automatically send the designated reply content to the caller number. Since the terminal can identify unknown calls through the yellow pages server, and automatically return different reply contents to the caller number according to different identification results, the manner of replying a call is simple and convenient to operate, is more intelligent, and has an optimal simplification.

Figure 10:
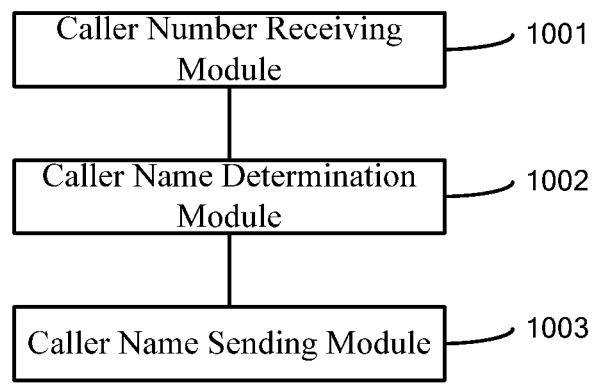
FIG. 10 is a block diagram of a fifth device for replying a call, according to an exemplary embodiment.

FIG. 10 is a block diagram of a device for replying a call, according to an exemplary embodiment. Referring to FIG. 10, the device includes a caller number receiving module 1001, a caller name determination module 1002, and a caller name sending module 1003.

The caller number receiving module 1001 is configured to receive a caller number sent by a terminal. The caller name determination module 1002 is connected with the caller number receiving module 1001, and configured to determine a caller name corresponding to the caller number according to a corresponding relationship between number information and a number name. The caller name sending module 1003 is connected with the caller name determination module 1002, and configured to send the caller name to the terminal, which determine a designated grouping type corresponding to the caller number according to the caller name when a call reply operation is performed by a user, determine a designated reply content matched with the designated grouping type according to a corresponding relationship between the grouping type and the reply content. The grouping type at least includes a service class number and a contact number, and sends the designated reply content to the caller number.

Figure 11:
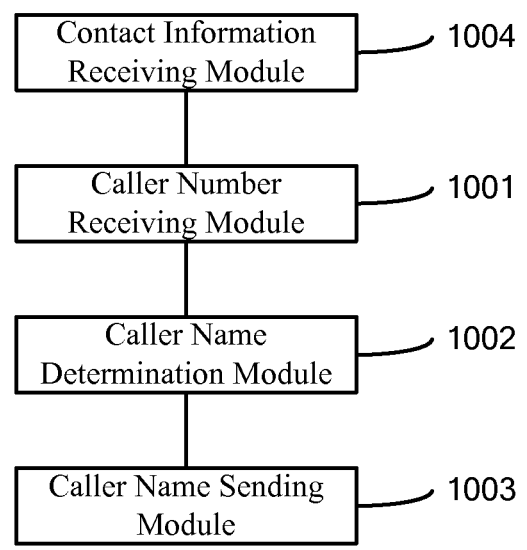
FIG. 11 is a block diagram of a sixth device for replying a call, according to an exemplary embodiment.

Optionally, referring to FIG. 11, the device further includes a contact information receiving module 1004 configured to receive contact information sent by a plurality of terminals, the contact information at least including the number information and the number name, generate a corresponding relationship between the number information and the number name according to the received contact information, and store the corresponding relationship. Alternatively, the contact information module 1004 is configured to acquire the contact information from the plurality of terminals, generate the corresponding relationship between the number information and the number name according to the acquired contact information, and store the corresponding relationship.

According to the device provided by embodiments of the present disclosure, during the course of receiving an incoming call, the terminal sends the caller number to the yellow pages server when the number consistent with the caller number is not stored in the local address book, and the caller name corresponding to the caller number is determined by the yellow pages server. Afterwards, if it is determined that the call reply operation is performed by the user, the terminal determines the designated grouping type corresponding to the caller number according to the obtained caller name, so as to determine the designated reply content matched with the designated grouping type according to the corresponding relationship between the grouping type and the reply content, and automatically send the designated reply content to the caller number. Since the terminal can identify unknown calls through the yellow pages server, and automatically return different reply contents to the caller number according to different identification results, the manner of replying a call is simple and convenient to operate, is more intelligent, and has an optimal simplification.

With respect to the devices in the above embodiments, the specific manners for performing operations for individual modules therein have been described in detail in the embodiments regarding the methods, which will not be elaborated herein.

Figure 12:
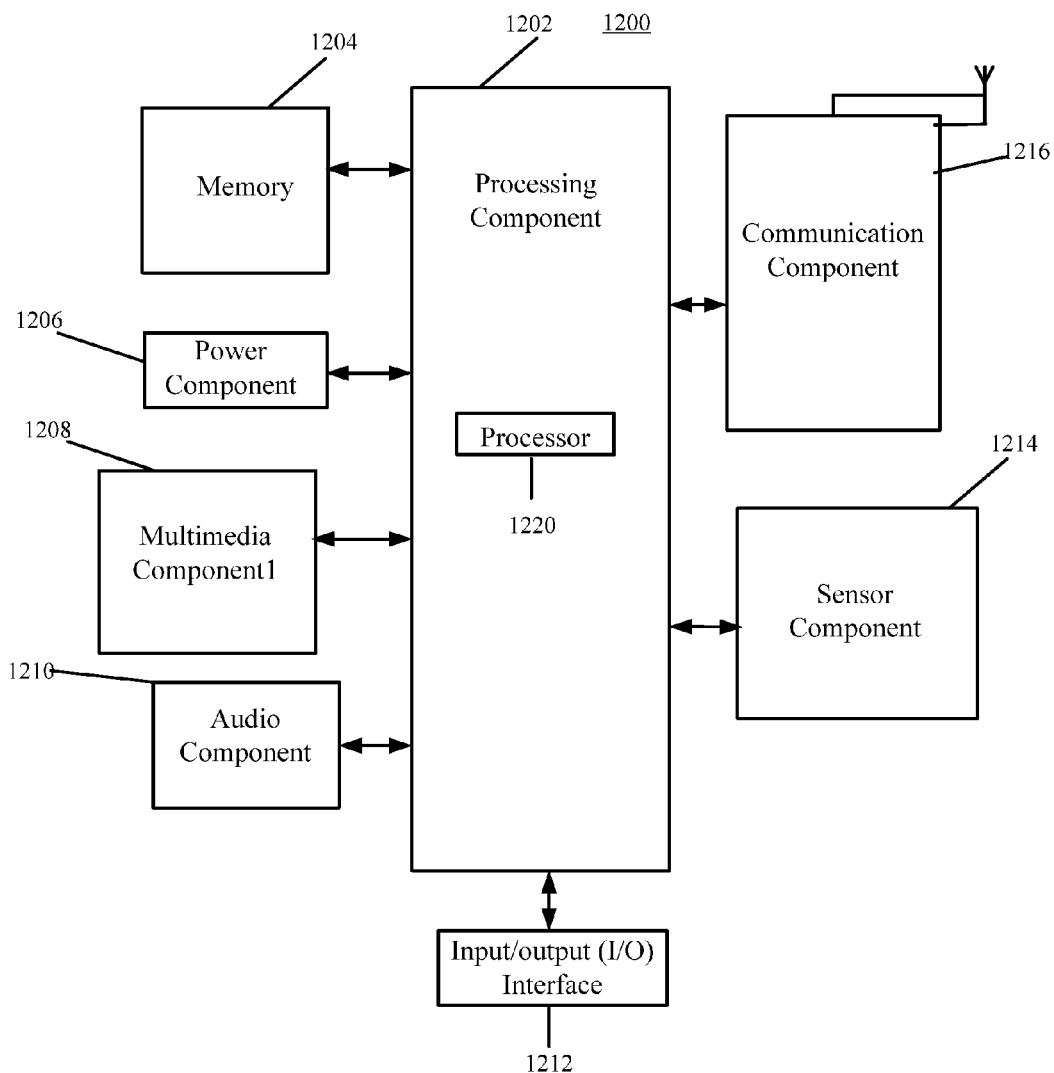
FIG. 12 is a block diagram of a terminal, according to an exemplary embodiment.

FIG. 12 is a block diagram of a terminal 1200 for replying a call, according to an exemplary embodiment. For example, the terminal 1200 may be a mobile phone, a computer, a digital broadcast terminal, a messaging device, a gaming console, a tablet, a medical device, exercise equipment, a personal digital assistant, and the like.

Referring to FIG. 12, the terminal 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the terminal 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the terminal 1200. Examples of such data include instructions for any applications or methods operated on the terminal 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the terminal 1200. The power component 1206 may include a power management system, one or more power sources, and any other components associated with the generation, management, and distribution of power in the terminal 1200.

The multimedia component 1208 includes a screen providing an output interface between the terminal 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and/or the rear camera may receive an external multimedia datum while the terminal 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the terminal 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the terminal 1200. For instance, the sensor component 1214 may detect an open/closed status of the terminal 1200, relative positioning of components, e.g., the display and the keypad, of the terminal 1200, a change in position of the terminal 1200 or a component of the terminal 1200, a presence or absence of user contact with the terminal 1200, an orientation or an acceleration/deceleration of the terminal 1200, and a change in temperature of the terminal 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the terminal 1200 and other devices. The terminal 1200 can access a wireless network based on a communication standard, such as WiFi, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 1204, executable by the processor 1220 in the terminal 1200, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when an instruction in a storage medium is performed by a processor of a mobile terminal, enables the mobile terminal to perform a method for replying a call. The method includes during the course of receiving an incoming call, if a number consistent with a caller number is not stored in a local address book, sending a caller number to a yellow pages server which determines a caller name corresponding to the caller number, receiving the caller name returned by the yellow pages server, determining whether a call reply operation is performed by a user, when the call replying operation is performed by the user, determining a designated grouping type corresponding to the caller number according to the caller name, and determining a designated reply content matched with the designated grouping type according to a corresponding relationship between the grouping type and the reply content. The grouping type at least includes a service class number and a contact number. The method also includes sending the designated reply content to the caller number.

Optionally, before the sending the caller name to the yellow pages server, the method further includes if the number consistent with the caller number is stored in the local address book, determining the caller name corresponding to the caller number according to a designated contact information table entry in the local address book. The designated contact information table entry refers to an information table entry to which the caller number belongs.

Optionally, before the determining the designated grouping type corresponding to the caller number according to the caller name, the method further includes setting a plurality of grouping keywords corresponding to each grouping type. Determining the designated grouping type corresponding to the caller number according to the caller name includes performing a word segmentation on the caller name to obtain at least one word segment, determining whether the at least one word segment includes the grouping keyword corresponding to any grouping type, and if the at least one word segment includes the grouping keyword corresponding to any grouping type, determining the any grouping type as the designated grouping type corresponding to the caller number.

Optionally, after the determining the designated grouping type corresponding to the caller number according to the caller name, the method further includes when the caller number is determined to be a nuisance number according to the caller name, hanging up the current call.

According to the non-transitory computer-readable storage medium provided by embodiments of the present disclosure, during the course of receiving an incoming call, the terminal sends the caller number to the yellow pages server when the number consistent with the caller number is not stored in the local address book, the yellow pages server being configured to determine the caller name corresponding to the caller number. Afterwards, if it is determined that the call reply operation is performed by the user, the terminal determines the designated grouping type corresponding to the caller number according to the obtained caller name, so as to determine the designated reply content matched with the designated grouping type according to the corresponding relationship between the grouping type and the reply content, and automatically send the designated reply content to the caller number. Since the terminal can identify unknown calls through the yellow pages server, and automatically return different reply contents to the caller number according to different identification results, the manner of replying a call is simple and convenient to operate, is more intelligent, and has an optimal simplification.

Figure 13:
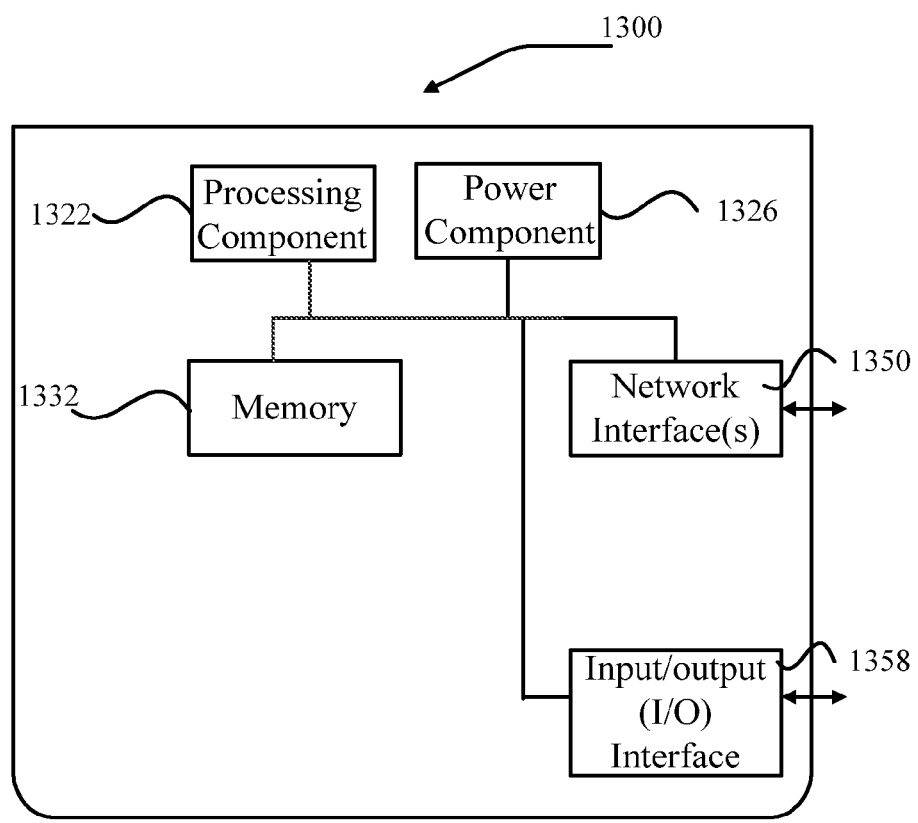
FIG. 13 is a block diagram of a server, according to an exemplary embodiment.

FIG. 13 is a block diagram of a server 1300 for replying a call, according to an exemplary embodiment. For example, the device 1300 may be provided as a server. Referring to FIG. 13, the device 1300 includes a processing component 1322 that further includes one or more processors, and memory resources represented by a memory 1332 for storing instructions executable by the processing component 1322, such as application programs. The application programs stored in the memory 1332 may include one or more modules each corresponding to a set of instructions. Further, the processing component 1322 is configured to execute the instructions to perform the method executed by the yellow pages server in the above method for replying a call.

The server 1300 may also include a power component 1326 configured to perform power management of the server 1300, wired or wireless network interface(s) 1350 configured to connect the server 1300 to a network, and an input/output (I/O) interface 1358. The server 1300 may operate based on an operating system stored in the memory 1332, such as Windows Server™, Mac OS X™, Unix™, Linux™, FreeBSD™, or the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for replying to an incoming telephone call, comprising:
    determining, by a mobile terminal receiving an incoming telephone call, whether a caller number of the incoming telephone call is stored in a local address book contained in the mobile terminal;

if the number is not stored in the local address book, sending, by the mobile terminal, the caller number to a yellow pages server, the yellow pages server being configured to determine a caller name corresponding to the caller number;

receiving, by the mobile terminal, the caller name from the yellow pages server;

determining, by the mobile terminal, whether a call reply operation is performed;

if the call replying operation is performed, determining, by the mobile terminal, a designated grouping type for the caller number based on the caller name;

determining, by the mobile terminal, a designated reply content matched with the designated grouping type; and sending, by the mobile terminal, the designated reply content to the caller number, wherein the determining, by the mobile terminal, the designated grouping type for the caller number based on the caller name comprises: performing, by the mobile terminal, a word segmentation on the caller name to obtain at least one word segment determining, by the mobile terminal, whether the at least one word segment includes the grouping keyword corresponding to any grouping type; and when the at least one word segment includes the grouping keyword corresponding to a certain grouping type, then determining, by the mobile terminal, the certain grouping type as the designated grouping type corresponding to the caller number.

2. The method according to claim 1, wherein before the sending the caller number to the yellow pages server, the method further comprises:

if the number consistent with the caller number is stored in the local address book, determining a caller name corresponding to the caller number based on a designated contact information table entry in the local address book, wherein the designated contact information table entry is an information table entry to which the caller number belongs.

3. The method according to claim 1, wherein the designated grouping type includes a nuisance grouping type associated with a predefined set of nuisance numbers, and wherein after the determining the designated grouping type corresponding to the caller number based on the caller name, the method further comprises:

when the caller number is determined to be a nuisance number of the nuisance numbers based on the caller name, hanging up the incoming telephone.

4. The method according to claim 2, wherein the designated grouping type includes a nuisance grouping type associated with a predefined set of nuisance numbers, and wherein after the determining the designated grouping type corresponding to the caller number based on the caller name, the method further comprises:

when the caller number is determined to be a nuisance number of the nuisance numbers based on the caller name, hanging up the incoming telephone.

5. The method according to claim 1, wherein the designated grouping type includes a nuisance grouping type associated with a predefined set of nuisance numbers, and wherein after the determining the designated grouping type corresponding to the caller number based on the caller name, the method further comprises:

when the caller number is determined to be a nuisance number of the nuisance numbers based on the caller name, hanging up the incoming telephone.

6. The method according to claim 1, wherein determining a designated reply content matched with the designated grouping type comprises:

referring to a relationship table storing reply contents in association with designated grouping types.

7. The method according to claim 1, wherein the grouping type includes at least one of service grouping type, a contact grouping type and a nuisance grouping type.

8. The method according to claim 1, wherein determining a designated reply content matched with the designated grouping type based on a relationship table comprises:

identifying a plurality of reply contents matched with the designated grouping type; and selecting one of the plurality of the reply contents as the designated reply content based on a sub-item included in the designated grouping type.

9. A terminal, comprising:

a processor; and a memory for storing instructions executable by the processor;

wherein the processor is configured to:

determine whether a caller number of an incoming telephone call is stored in a local address book contained in the terminal;

if the call number is not stored in the local address book, send the caller number to a yellow pages server, the yellow pages server being configured to determine a caller name corresponding to the caller number;

receive the caller name;

determine whether a call reply operation is performed by a user;

when the call replying operation is performed by the user, determine a designated grouping type corresponding to the caller number based on of the caller name;

determine a designated reply content matched with the designated grouping type based on a corresponding relationship between the grouping type and the reply content; and send the designated reply content to the caller number, wherein the processor is further configured to: perform a word segmentation on the caller name to obtain at least one word segment determine whether the at least one word segment includes the grouping keyword corresponding to any grouping type; and when the at least one word segment includes the grouping keyword corresponding to a certain grouping type, then determine the certain grouping type as the designated grouping type corresponding to the caller number.

10. The terminal according to claim 9, wherein the processor is further configured to:

if the number consistent with the caller number is stored in the local address book, determine a caller name corresponding to the caller number based on a designated contact information table entry in the local address book, wherein the designated contact information table entry is an information table entry to which the caller number belongs.

11. The terminal according to claim 9, wherein the designated grouping type includes a nuisance grouping type associated with a predefined set of nuisance numbers, and wherein the processor is further configured to:

when the caller number is determined to be a nuisance number of the nuisance numbers based on the caller name, hang up the incoming telephone call.

12. The terminal according to claim 10, wherein the designated grouping type includes a nuisance grouping type associated with a predefined set of nuisance numbers, and wherein the processor is further configured to:
when the caller number is determined to be a nuisance number of the nuisance numbers based on the caller name, hang up the incoming telephone call.

13. The terminal according to claim 9, wherein the designated grouping type includes a nuisance grouping type associated with a predefined set of nuisance numbers, and wherein the processor is further configured to:
when the caller number is determined to be a nuisance number of the nuisance numbers based on the caller name, hang up the incoming telephone call.

14. The terminal according to claim 9, wherein the grouping type includes at least one of service grouping type, a contact grouping type and a nuisance grouping type.

15. A server, comprising:
a processor; and
a memory for storing instructions executable by the processor,
wherein the processor is configured to:
receive a caller number from a terminal;
determine a caller name corresponding to the caller number based on a corresponding relationship between number information and a number name;
send the caller name to the terminal, the terminal being configured to determine a designated grouping type corresponding to the caller number based on the caller name when a call reply operation is performed;
determine a designated reply content matched with the designated grouping type based on a corresponding relationship between the grouping type and the reply content; and
send the designated reply content to the caller number,
wherein the terminal is further configured to: perform a word segmentation on the caller name to obtain at least one word segment determine whether the at least one word segment includes the grouping keyword corresponding to any grouping type; and when the at least one word segment includes the grouping keyword corresponding to a certain grouping type, then determine the certain grouping type as the designated grouping type corresponding to the caller number.

16. The server according to claim 15, wherein the processor is further configured to:
receive contact information sent by a plurality of terminals, the contact information at least comprising the number information and the number name;
generate the corresponding relationship between the number information and the number name based on the received contact information; and
store the corresponding relationship.

17. The server according to claim 15, wherein the processor is further configured to:
acquire contact information from a plurality of terminals, the contact information at least comprising the number information and the number name;
generate the corresponding relationship between the number information and the number name based on the acquired contact information; and
store the corresponding relationship.

18. The server according to claim 15, wherein the grouping type includes at least one of service grouping type, a contact grouping type, and a nuisance grouping type.

* * * * *